(12) United States Patent
Bernaudin et al.

(10) Patent No.: US 10,775,971 B2
(45) Date of Patent: Sep. 15, 2020

(54) PINCH GESTURES IN A TILE-BASED USER INTERFACE

(71) Applicants: Ingrid Bernaudin, Palo Alto, CA (US); David Hsia, Palo Alto, CA (US); Derrick Koon, Palo Alto, CA (US); Animesh Das, Palo Alto, CA (US); Steve Zyskiewicz, Palo Alto, CA (US)

(72) Inventors: Ingrid Bernaudin, Palo Alto, CA (US); David Hsia, Palo Alto, CA (US); Derrick Koon, Palo Alto, CA (US); Animesh Das, Palo Alto, CA (US); Steve Zyskiewicz, Palo Alto, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 1107 days.

(21) Appl. No.: 13/931,592

(22) Filed: Jun. 28, 2013

(65) Prior Publication Data
US 2015/0007099 A1    Jan. 1, 2015

(51) Int. Cl.
| | | |
|---|---|---|
| *G06F 3/14* | (2006.01) | |
| *G06F 3/0484* | (2013.01) | |
| *G06F 3/0486* | (2013.01) | |
| *G06F 3/0488* | (2013.01) | |
| *G06F 3/0481* | (2013.01) | |
| *G06F 3/0482* | (2013.01) | |

(52) U.S. Cl.
CPC .......... *G06F 3/0484* (2013.01); *G06F 3/0481* (2013.01); *G06F 3/0482* (2013.01); *G06F 3/0486* (2013.01); *G06F 3/0488* (2013.01); *G06F 3/04842* (2013.01); *G06F 3/04845* (2013.01); *G06F 3/04883* (2013.01); *G06F 2203/04808* (2013.01)

(58) Field of Classification Search
CPC .................................... G06F 3/14; G06F 3/17
USPC ........ 715/720, 783, 838; 345/169, 667, 681, 345/173; 705/27.2
See application file for complete search history.

(56) References Cited

U.S. PATENT DOCUMENTS

| | | | |
|---|---|---|---|
| 5,537,618 | A | 7/1996 | Boulton et al. |
| 5,590,250 | A | 12/1996 | Lamping et al. |
| 6,085,202 | A | 7/2000 | Rao et al. |
| 7,113,088 | B2 | 9/2006 | Frick et al. |
| 7,376,585 | B2 | 5/2008 | Haller |
| 7,634,733 | B2 | 12/2009 | Sadikaili et al. |
| 7,949,954 | B1 | 5/2011 | Jezek |

(Continued)

OTHER PUBLICATIONS

Root, Users Guide 5.26, published in Dec. 2009, available at <URL=ftp://root.cern.ch/root/doc/Users_Guide_5_26.

(Continued)

*Primary Examiner* — Ruay Ho
(74) *Attorney, Agent, or Firm* — Fountainhead Law Group P.C.

(57) ABSTRACT

A tile-based user interface (UI) may be presented on a display device in tile view in full-screen view. The underlying application is active whether the UI is in tile view or in full-screen view, and may generate data that can be presented via the UI. In tile view, the UI may present abbreviated representations of information generated by the underlying application. In full-screen view, the UI may present detailed representations of information, including graphical UI elements and data elements that were not presented in the tile view UI.

19 Claims, 9 Drawing Sheets

(56) References Cited

U.S. PATENT DOCUMENTS

| | | | |
|---|---|---|---|
| 8,296,667 B2 | 10/2012 | Tewari et al. | |
| 8,365,090 B2 | 1/2013 | Ording | |
| 8,527,909 B1 | 9/2013 | Mullany | |
| 8,941,657 B2 | 1/2015 | Agarwal et al. | |
| 2002/0073146 A1 | 6/2002 | Bauer | |
| 2005/0044058 A1* | 2/2005 | Matthews | G06F 9/4418 |
| 2005/0283739 A1 | 12/2005 | Mohr et al. | |
| 2006/0026535 A1 | 2/2006 | Hotelling et al. | |
| 2008/0165403 A1 | 7/2008 | Grasshoff | |
| 2009/0031247 A1 | 1/2009 | Walter | |
| 2009/0164944 A1* | 6/2009 | Webster | G06F 3/0482 |
| | | | 715/838 |
| 2009/0178009 A1 | 7/2009 | Dotson et al. | |
| 2010/0231595 A1 | 9/2010 | Dang et al. | |
| 2010/0269062 A1 | 10/2010 | Kobylinski | |
| 2010/0283743 A1 | 11/2010 | Coddington | |
| 2011/0074710 A1 | 3/2011 | Weeldreyer et al. | |
| 2011/0107220 A1* | 5/2011 | Perlman | A63F 13/12 |
| | | | 715/720 |
| 2011/0109632 A1 | 5/2011 | Gorev | |
| 2011/0145759 A1 | 6/2011 | Leffert | |
| 2011/0209100 A1 | 8/2011 | Hinckley et al. | |
| 2011/0283188 A1 | 11/2011 | Farrenkopf et al. | |
| 2011/0283231 A1 | 11/2011 | Richstein et al. | |
| 2011/0283242 A1 | 11/2011 | Chew et al. | |
| 2011/0298724 A1 | 12/2011 | Ameling et al. | |
| 2011/0302527 A1 | 12/2011 | Chen et al. | |
| 2012/0007868 A1 | 1/2012 | Buck | |
| 2012/0030275 A1 | 2/2012 | Boller et al. | |
| 2012/0081292 A1* | 4/2012 | Sirpal | G06F 1/1616 |
| | | | 345/169 |
| 2012/0089950 A1 | 4/2012 | Tseng | |
| 2012/0092267 A1 | 4/2012 | Haug | |
| 2012/0096394 A1 | 4/2012 | Balko et al. | |
| 2012/0151417 A1 | 6/2012 | Wong et al. | |
| 2012/0306930 A1 | 12/2012 | Decker et al. | |
| 2013/0016128 A1 | 1/2013 | Bhatt | |
| 2013/0067390 A1 | 3/2013 | Kwiatkowski et al. | |
| 2013/0067391 A1 | 3/2013 | Pittappilly et al. | |
| 2013/0067398 A1 | 3/2013 | Pittappilly et al. | |
| 2013/0067420 A1 | 3/2013 | Pittappilly et al. | |
| 2013/0080884 A1 | 3/2013 | Lisse et al. | |
| 2013/0080975 A1 | 3/2013 | Geithner | |
| 2013/0155116 A1* | 6/2013 | Paretti | G09G 5/14 |
| | | | 345/667 |
| 2013/0179644 A1 | 7/2013 | Tomi | |
| 2013/0229440 A1* | 9/2013 | MacDonald | G09G 5/14 |
| | | | 345/681 |
| 2013/0335337 A1* | 12/2013 | Chua | G06F 3/0488 |
| | | | 345/173 |
| 2014/0047381 A1 | 2/2014 | Fan et al. | |
| 2014/0281868 A1 | 9/2014 | Vogel et al. | |
| 2014/0300603 A1 | 10/2014 | Greenfield | |
| 2014/0372924 A1 | 12/2014 | Shih | |
| 2015/0007078 A1 | 1/2015 | Feng et al. | |
| 2015/0149329 A1* | 5/2015 | Tam | G06Q 30/0643 |
| | | | 705/27.2 |

OTHER PUBLICATIONS

Redfin Blog, "Cluster Buck Rogers," Oct. 25, 2010 available at: <URL=https://www.redfin.com/blog/2010/10/cluster_buck_rogers.html#.VQw47PldXII>, last accessed Apr. 28, 2015.

* cited by examiner

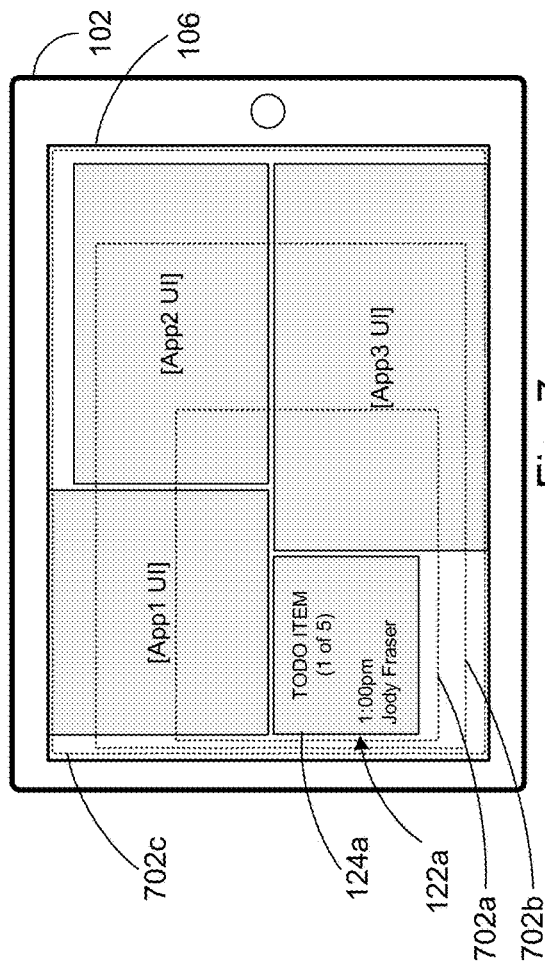
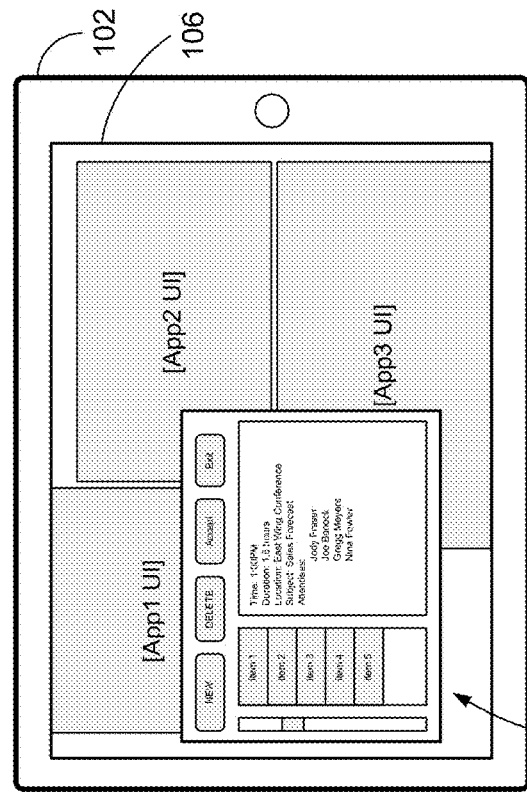
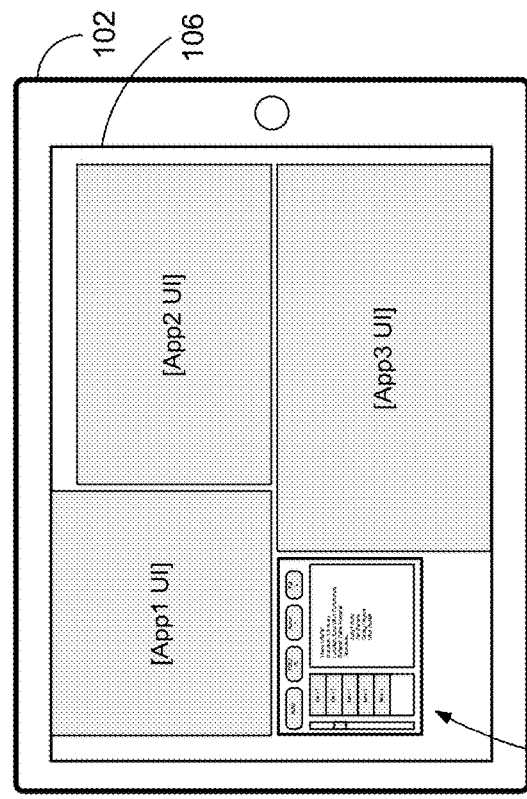

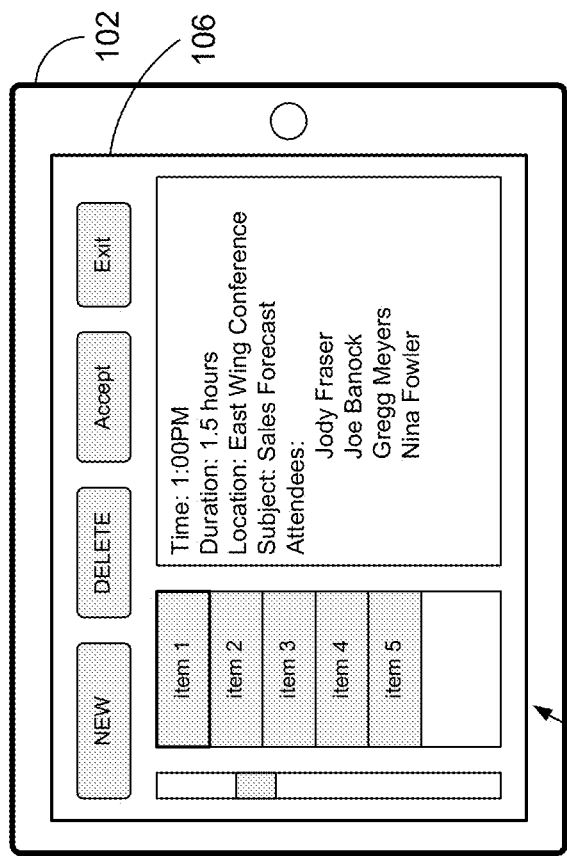
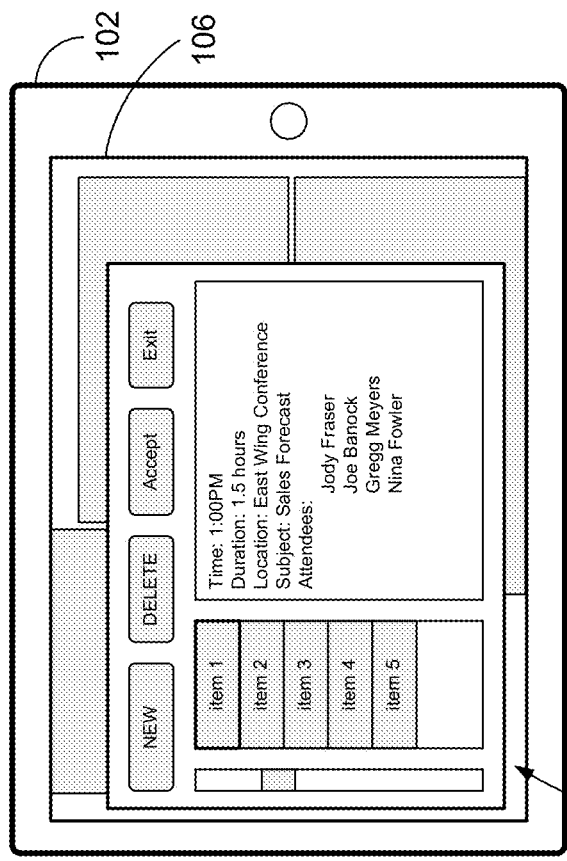
Fig. 7D
Fig. 7C

PINCH GESTURES IN A TILE-BASED USER INTERFACE

CROSS REFERENCE TO RELATED APPLICATIONS

The present disclosure relates to commonly owned, concurrently filed U.S. application Ser. No. 13/931,559 filed Jun. 28, 2013, entitled "DATA DISPLAYS IN A TILE-BASED USER INTERFACE", the content of which is incorporated herein by reference in its entirety for all purposes.

BACKGROUND

Unless otherwise indicated herein, the approaches described in this section are not prior art to the claims in this application and are not admitted to be prior art by inclusion in this section.

Tile-based user interfaces (UIs) are becoming increasingly common in mobile computing devices. A tile-based application may present its UI in a tile that is displayed among several other tiles in the display area of an output device. The amount of information available from a tile is limited because the tile typically occupies only a small portion of the display area. Similarly, the functionality that is available through a tile is limited due to the small size of the tile. Access to the detailed information and full functionality of a tile-based application requires the user to bring up a full-screen view of the application's UI.

BRIEF DESCRIPTION OF THE DRAWINGS

FIGS. 7, 7A, 7B, 7C, and 7D illustrate a sequence of a zoom in animation.

DETAILED DESCRIPTION

In the following description, for purposes of explanation, numerous examples and specific details are set forth in order to provide a detailed understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
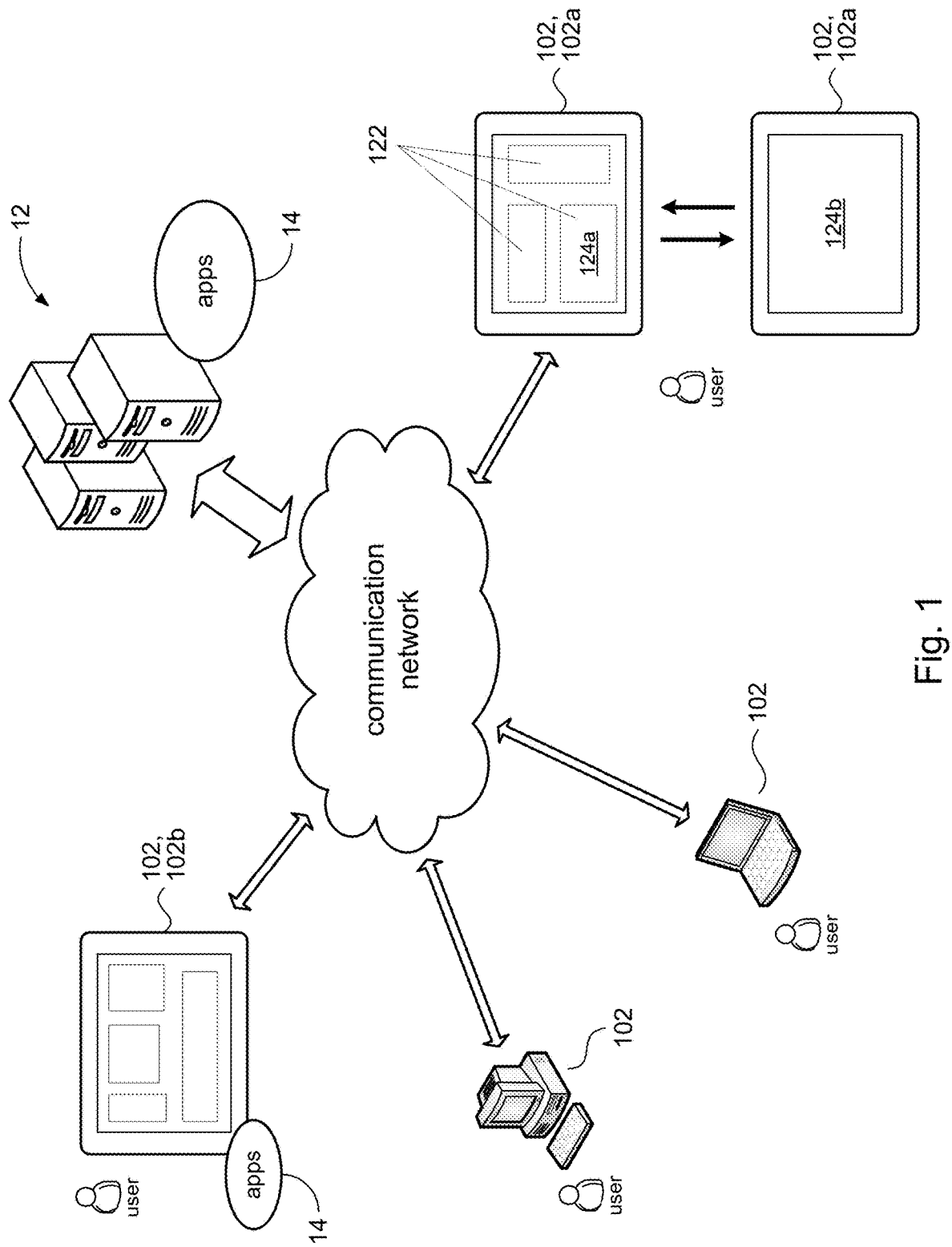
FIG. 1 shows a system of computers in accordance with the present disclosure.

FIG. 1 shows a user environment in accordance with embodiments of the present disclosure. Users may access a server system 12 over a suitable communication network using their computing devices 102. In some embodiments, for example, the users may be workers in an organization such as a business enterprise. The server systems 12 may be various backend systems in the enterprise to support the user's efforts in the enterprise. The server systems 12 may include, for example, customer relationship management (CRM) systems, enterprise resource planning (ERP) systems, and so on. The backend systems 12 may execute various applications 14 in order to provide information access and other services to users who need to access the backend systems 12.

Users may access applications 14 running on the backend systems 12 using their computing devices 102. Typical computing devices 102 include desktop computers, laptop computers, and the like. In accordance with the present disclosure, the backend servers 12 may be accessed using mobile computing devices 102a, 102b, such as computing tablets, smart phones, and the like.

In addition to applications 14 running on the backend servers 12, in some embodiments, some applications 14 may be installed and executed on the computing devices 102. Services provided by the backend systems 12 may be accessed, for example, using web interface technology such as the web services description language (WSDL), the simple object access protocol (SOAP), and so on.

In accordance with the present disclosure, "tiling" may be used to allow users to have concurrent access to several applications at a time on their computing devices 102. For example, computing device 102a shows a display having several tiles 122 presented on the display. Each tile 122 may be associated with an application 14. The UI for each application 14 may be presented in a "tile view" 124a or in a "full-screen view" 124b. As will be explained in more detail, the user may switch between the UI in the tile view 124a and the UI in full-screen view.

Figure 2:
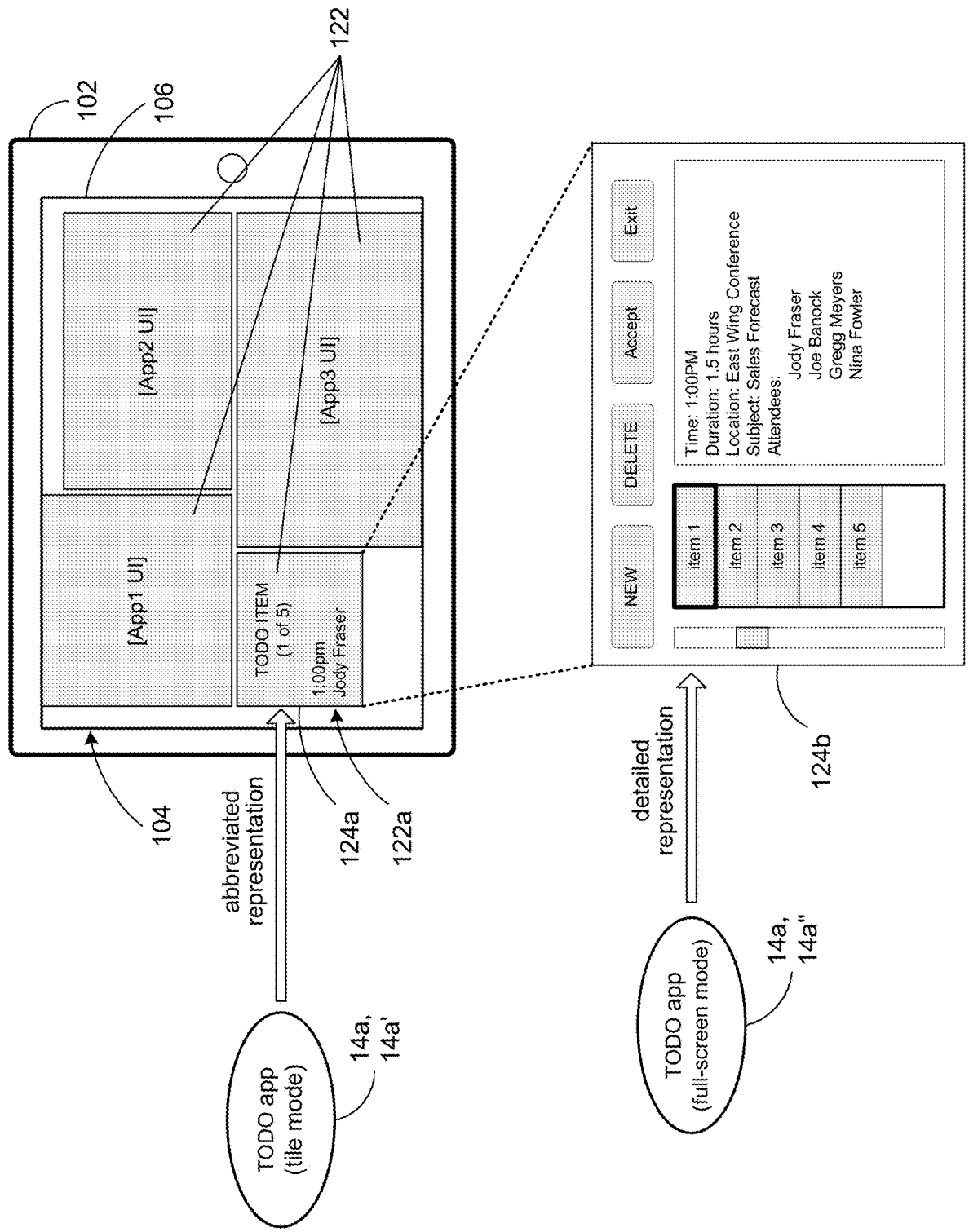
FIG. 2 illustrates aspects of a tile view user interface (UI) and a full-screen UI.

Referring now to FIG. 2, in some embodiments, the computing device 102 may include a touch-sensitive display 104 on which a user may make conventional "gestures" by swiping and/or tapping their finger(s) on the surface touch-sensitive display. In other embodiments, the computing device 102 may include a touch-sensitive pad (track pad) on which the user may make their gestures. A display area 106 of the touch-sensitive display 104 may display several tiles 122. In some embodiments, the user may use a tap and drag kind of gesture to drag the display of tiles 122 to bring into view other tiles that lie partially or entirely beyond the viewable boundaries of the display area 106. For example, the UIs associated with respective applications App1 and App3 lie partially beyond the viewable boundaries of the display area 106, whereas the UI's associated with respective applications App2 and the TODO application 14a lie entirely within the viewable boundaries of the display area.

Each tile 122 may be associated with an application 14. For example, FIG. 2 shows tiles that are associated with respective applications App1, App2, App3. Tile 122a is associated with a TODO application 14a. Each tile 122 presents the UI of the application associated with that tile. In accordance with the present disclosure, the UI of an application 14 may be presented in a tile, or in full-screen mode where the UI occupies substantially the entire display area 106 of the touch-sensitive display 104. A UI that is presented in a tile 122 may be referred to herein as a "UI in tile view", "tile view UI", and the like. Likewise, a UI that is presented in full-screen mode may be referred to herein as a "UI in full-screen view", "full-screen view UI", and the like.

In accordance with the present disclosure, when a UI (e.g., 124a) is presented in a tile (e.g., 122a), the UI may present an "abbreviated representation" of the information generated by its associated application (e.g., 14a). In some embodiments, the abbreviated representation of information may be generated by the application, which may then be presented in the tile view UI. Accordingly, the application may be said to be in "tile" mode. Thus, for example, FIG. 2 shows the TODO application 14a in tile mode 14a'.

Further in accordance with the present disclosure, when a UI is presented in full-screen mode (e.g., 124b), the UI may present a "detailed representation" of the information generated by its application (e.g., 14a). Accordingly, the application may be said to be in "full-screen" mode. For example, FIG. 2 shows the TODO application 14a in full-screen mode 14a" providing a detailed representation of information generated by the application for presentation in the full-screen view UI 124b.

The specific information that constitutes an abbreviated representation of the information that is generated by an application 14 will vary from one application to another. In accordance with the present disclosure, for example, an abbreviated representation may take into account the limited display area of the tile (e.g., 122a) in which the tile view UI (e.g., 124a) is presented. For instance, depending on the size of the tile, it may not be practical to display scroll bars in the tile view UI that is presented in that tile. Accordingly, the abbreviated representation of information that is presented in the tile view UI may be "complete" in the sense so that the user need not scroll the tile view UI to view the data; all of the data should be presented in the viewable area of the tile. In FIG. 2, for example, the tile view UI 124a illustrates an example of an abbreviated representation of the TODO application 14a comprising a single to-do item. The displayed to-do item may not have all the details, but is "complete" in that there is no other information for that to-do item that lies beyond the viewable boundary of the tile 122a, which would require the user to scroll UI.

As alluded to above, an abbreviated representation may omit many of the graphical UI (GUI) elements and data elements that the application 14 may generate. FIG. 2, for example, shows an example of a full-screen UI 124b of the TODO application 14a. The full-screen UI 124b includes buttons (e.g., NEW, DELETE, Accept, and Exit), a list of to-do items, a scroll bar for scrolling the list of to-do items, and an area that shows the details of a selected to-do item. It can be appreciated that the tile view UI 124a cannot display most (if any at all) the GUI elements that can be presented in the full-screen UI 124b. Accordingly, the tile view UI 124a may omit one or more (or all) of the GUI elements that would be shown in the full-screen UI. Likewise, the full functionality of an application 14 may not be available to a user in a tile view UI, for example, because buttons for accessing the functionality is not accessible in the tile view UI.

Figure 3A:
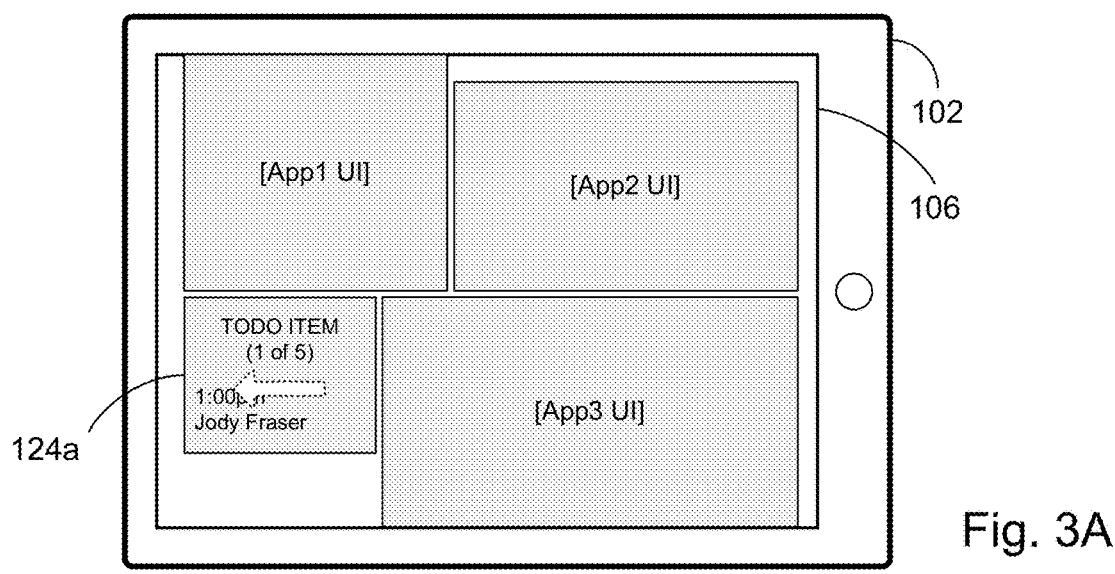
FIGS. 3A, 3B, and 3C illustrate an example of an actionable tile view UI.
Figure 3B:
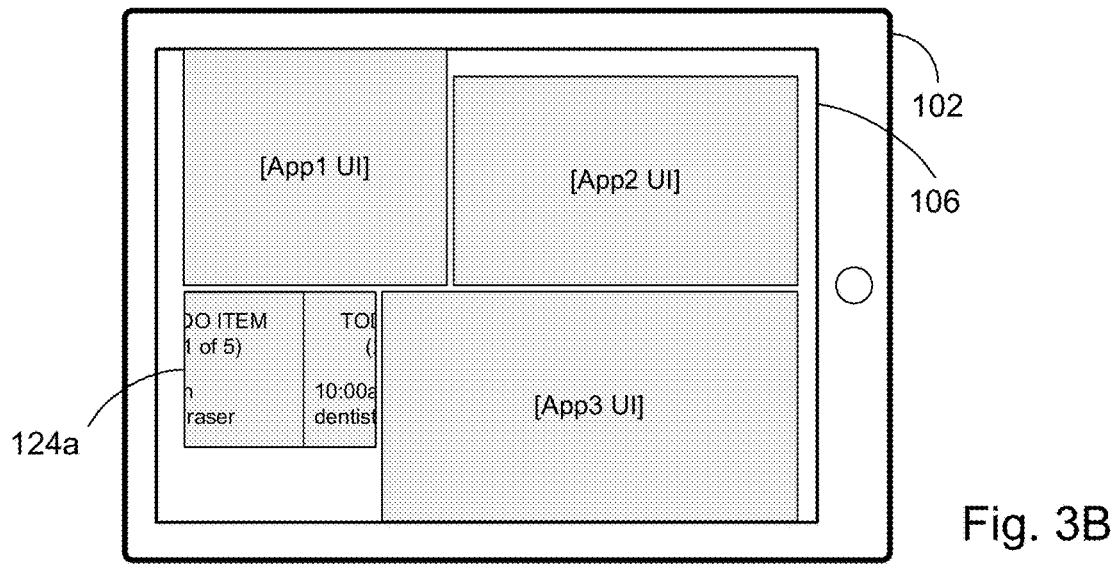
Figure 3C:
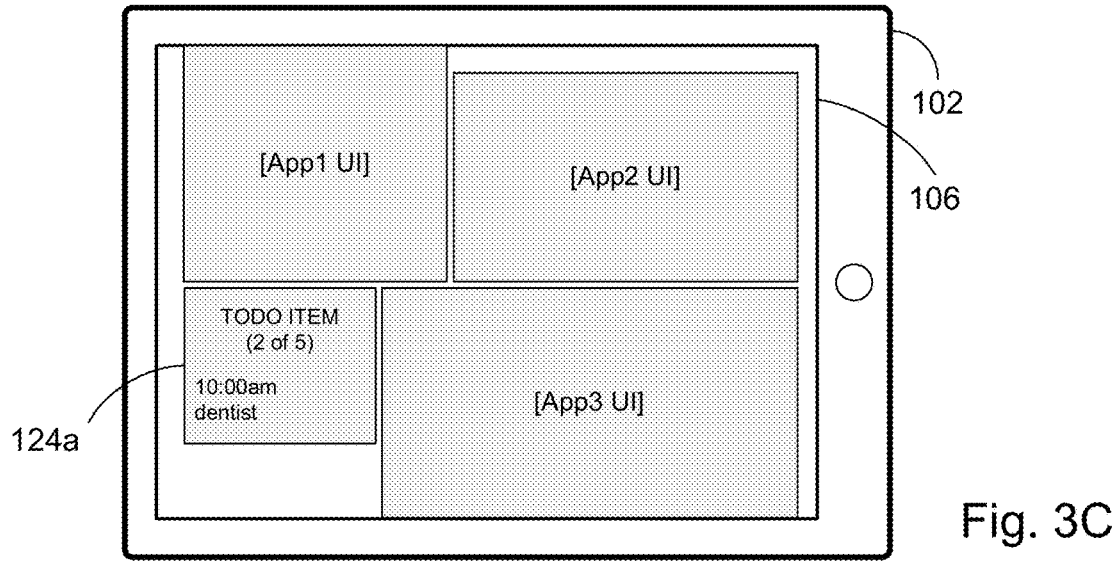

Referring now to FIGS. 3A, 3B, and 3C, another aspect of a tile view UI is that the UI is "actionable". The application 14 associated with the UI in tile view may receive actionable input from the user and respond to the actionable input by generating new information and possibly updating the tile view UI with an abbreviated representation of the new information. The actionable input may include gestures or data input made by the user. It will be appreciated that the kinds of actionable input that the application 14 will respond to will vary depending on the application.

A further aspect of the actionable UI is that in tile view, the application 14 remains "active", firstly in order to receive and respond to actionable input, but also to continue generating output for presentation in the tile view UI. For example, if the application is a stock market ticker application, the application is active when the UI is in full-screen view presenting, for instance, detailed information for a given stock (e.g., buy and sell prices, options trading information, and so on), functionality (e.g., buy and sell buttons), and so on. When the UI is in tile view, only abbreviated information is presented (e.g., only the current buy and sell price of the stock), but the application executing in tile mode nonetheless remains active. For example, the current buy and sell price presented in the tile view UI may be dynamically updated in real time fashion as the application produces new buy and sell price values.

Referring to FIGS. 2 and 3A, for example, the TODO application 14a may allow a user to view different to-do items in the tile view UI 124a. For example, if the user makes a swiping gesture in the area of the UI 124a (indicated in the figure by the directional arrow), the gesture may be provided to the TODO application 14a. The TODO application 14a (executing in tile mode 14a') may interpret the swipe action as a user request to present the next to-do item in the tile view UI 124a. In response, the application 14a may access the next to-do item and generate an abbreviated representation of it. To enhance the user's interactive experience, the tile view UI 124a may present an animation showing the sliding out of the currently presented to-do item (item "1 of 5") and the sliding in of the next to-do item (item "2 of 5"), as illustrated in FIG. 3B for example. Upon completion of the animation, the next to-do item is presented in the tile view UI 124a, FIG. 3C.

Figure 4:
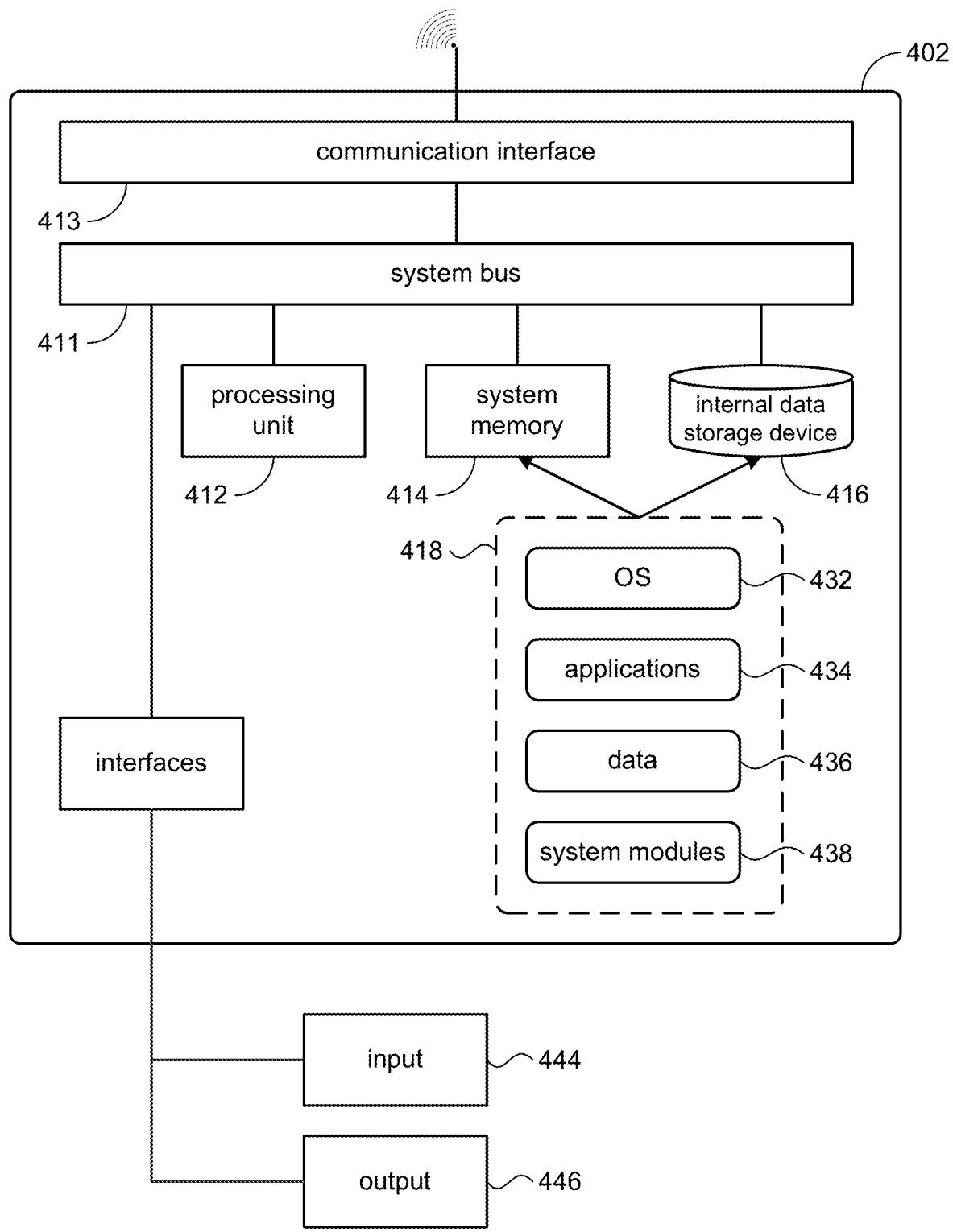
FIG. 4 shows an illustrative high-level block diagram of a computing device in accordance with the present disclosure.

Referring to FIG. 4, an illustrative implementation of computing device 102 in accordance with the present disclosure may include a computing part 402 having a processing unit 412, a system memory 414, and a system bus 411. The system bus 411 may connect various system components including, but not limited to, the processing unit 412, the system memory 414, an internal data storage device 416, and a communication interface 413. In a configuration where the computing device 102 is a mobile device (e.g., smartphone, computer tablet), the communication interface 413 may be a wireless interface for communication over a cellular network, using a WiFi® connection, and so on.

The processing unit 412 may comprise a single-processor configuration, or may be a multi-processor architecture. The system memory 414 may include read-only memory (ROM) and random access memory (RAM). The internal data storage device 416 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD), and so on. In a configuration where the computing device 102 is a mobile device, the internal data storage 416 may be a flash drive.

The internal data storage device 416 and its associated non-transitory computer-readable storage media provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 414 and/or the internal data storage device 416 may store a number of program modules, including an operating system (OS) 432, one or more application programs 434, program data 436, and other program/system modules 438. For example, the application programs 434, which when executed, may cause the computing part 402 to perform method steps of FIG. 5. The application programs 434 and/or the OS 432 may include a tile manager for managing the display of tiles 122 in the display area 106.

In some embodiments, access to the computing part 402 may be provided by an input component 444 (e.g., keyboard, mouse, etc.) and an output component 446. In some embodiments, where the computing device 102 is mobile device, the input 444 and output 446 may be components of a touch-sensitive device. In other embodiments, such as in a laptop computer, the input 444 may be a touch pad and the output 446 may be a display panel.

Figure 5:
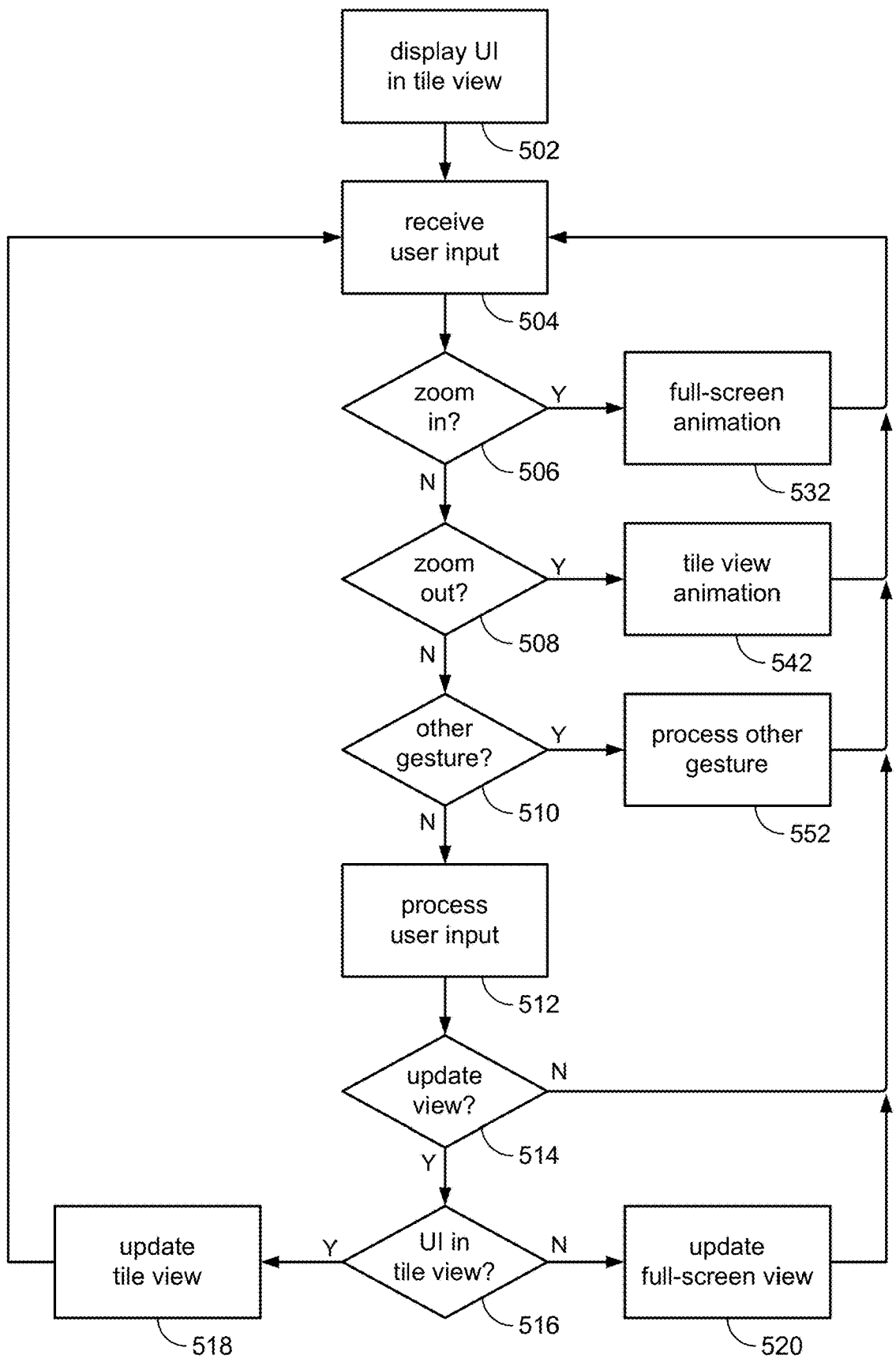
FIGS. 5, 5A, 5B illustrate processing in accordance with the present disclosure.

Referring to FIG. 5, a high level logical description of processing performed by the computing device 102 in accordance with some embodiments of the present disclosure will now be discussed. It will be appreciated that the specific algorithms and process flows will vary depending on a particular implementation of the present disclosure. The discussion starts at block 502, where the UI (e.g., 124a) of an application (e.g., TODO application 14a) is presented in a tile (e.g., 122a) that is displayed in the display area 106 of a computing device 102 among a plurality of tiles 122 displayed in the display area.

At block 504, user input may be received. The user input may be a gesture made on the display device (e.g., 104, FIG. 2) in the display area 106 near a tile. The user input may be directed to that tile or to the application associated with that tile. For example, the user input may be a gesture for moving the tile to a different location among the plurality of tiles displayed in the display area 106; e.g., the gesture may be tap and drag action. This would be an example of a user input that is directed to the tile because the user input is intended to affect the tile rather than what is presented in the tile.

The user input may be directed to the application associated with the tile. FIGS. 3A-3C, for instance, represent an example of user input directed to the application. There, the user's swiping gesture is provided to the TODO application 14a, and in response to the swiping gesture, the TODO application generates new information, namely the next to-do item, which may then be presented in the tile view UI 124a.

At block 506, a determination is made if the user input indicates a "zoom in" action directed to a tile. In some embodiments, for example, the zoom in action may comprise pinch gesture performed in the area of the tile to be zoomed into. In particular, the pinch gesture may be a "reverse" pinch in which two of the user's fingers (e.g., thumb and forefinger) are placed close together and then moved apart. It will be appreciated that in other embodiments, the zoom in action may comprise any other suitable gesture (e.g., a double tap). If at block 506, the user input is determined to be a zoom in gesture, then processing may proceed to block 532 to process the zoom in gesture. This will be described in more detail in connection with FIG. 5A. Processing from block 532 may then return to block 504 to receive further user input.

If at block 506, the user input is determined not to be a zoom in gesture, then processing may proceed to block 508, where a determination is made whether the user input indicates a "zoom out" action directed to a tile. In some embodiments, for example, a zoom out action may comprise pinch gesture (e.g., two fingers spaced apart and brought close together) performed in the area of the tile to be zoomed out of. It will be appreciated that in other embodiments, the zoom out action may be any other suitable gesture. If at block 508, the user input is determined to be a zoom out gesture, then processing may proceed to block 542 to process the zoom out gesture, which will be described in more detail below in connection with FIG. 5B. Processing from block 542 may then return to block 504 to receive further user input.

If at block 508, the user input is determined not to be a zoom out gesture, then processing may proceed to block 510, where a determination is made whether the user input indicates some other gesture directed to a tile. For example, in some embodiments the user input may be a gesture to move a tile to a new location. In other embodiments, the user input may be a gesture to move the entire display of tiles in order to bring other tiles into view in the display area 106, and so on. If the user input is another gesture directed to a tile, then processing may proceed to block 552 to process the gesture. Processing from block 552 may then return to block 504 to receive further user input.

If at block 510, the user input is determined not to be another gesture that is directed to a tile, then processing may proceed to block 512. In some embodiments, the user input at this point may be deemed to be directed to the application associated with the tile on which the gesture was made. Accordingly, at block 512, the user input may be processed by the application, which may or may not generate new information.

If, at block 514, the UI does not need to be updated (e.g., because no new information was generated, or the newly generated information does not affect the presentation in the UI), then processing may return to block 504 to receive further user input. If, on the other hand, new information is generated that needs to be displayed in the UI, then processing proceeds to block 516. FIGS. 3A-3C, for instance, illustrate an example where the user's swiping action causes the generation of new information, namely the next to-do item.

At block 516, if the UI is in tile view, then at block 518, the application may generate an abbreviated representation of the newly generated information. For example, a to-do item (e.g., as illustrated in 124b) contains much more information than can be practically presented in a tile view UI. Accordingly, at block 518, the TODO application 14a may generate an abbreviated representation of the to-do item; e.g., the abbreviated representation may include the time of the to-do item and only one party associated with the to-do item. The tile view UI may then be updated with the abbreviated representation of the newly generated information. Processing from block 518 may then return to block 504 to receive further user input.

If, at block 516, the UI is in full-screen view, then at block 520, the application may generate a detailed representation of the newly generated information. In the to-do example, the newly generated information may include all the details of the to-do item. More generally, however, the newly generated information may include new or additional graphical elements; e.g., to show additional data, additional functions, additional elements in the UI, and so on resulting from the application's response to the user input which can be presented in the full-screen UI. Processing from block 520 may then return to block 504 to receive further user input.

Figure 5B:
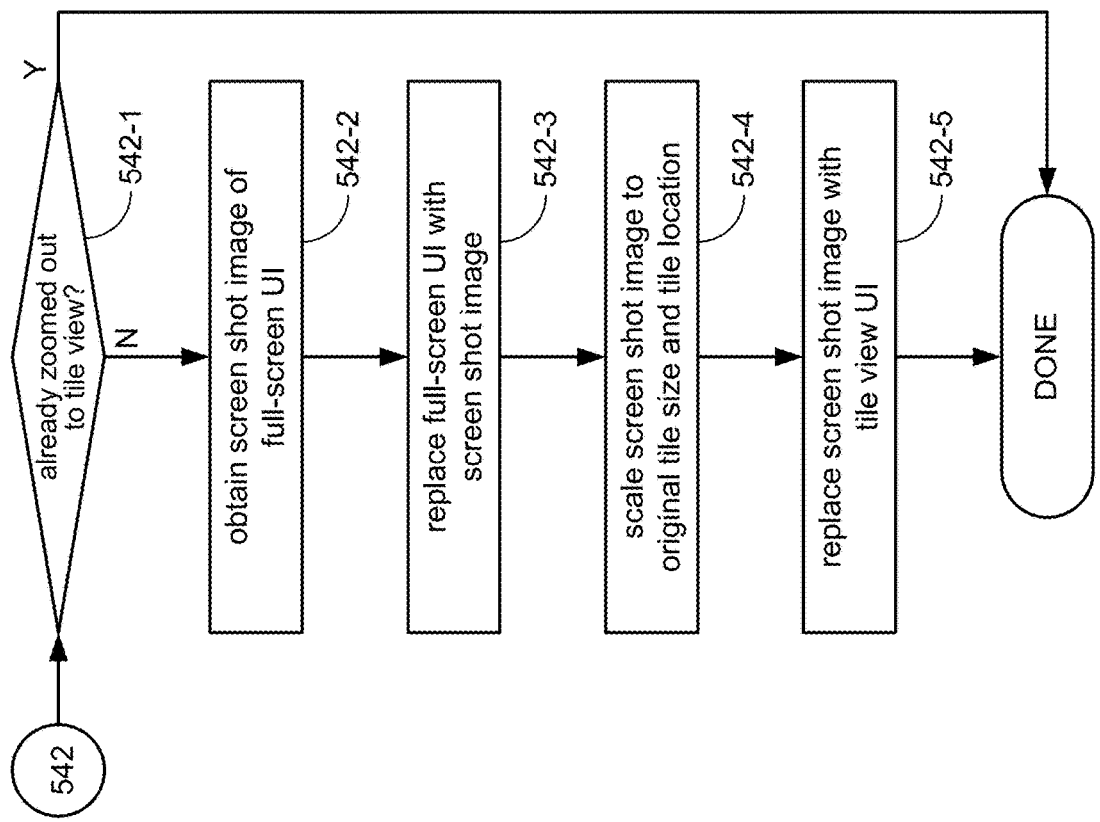
Figure 5A:
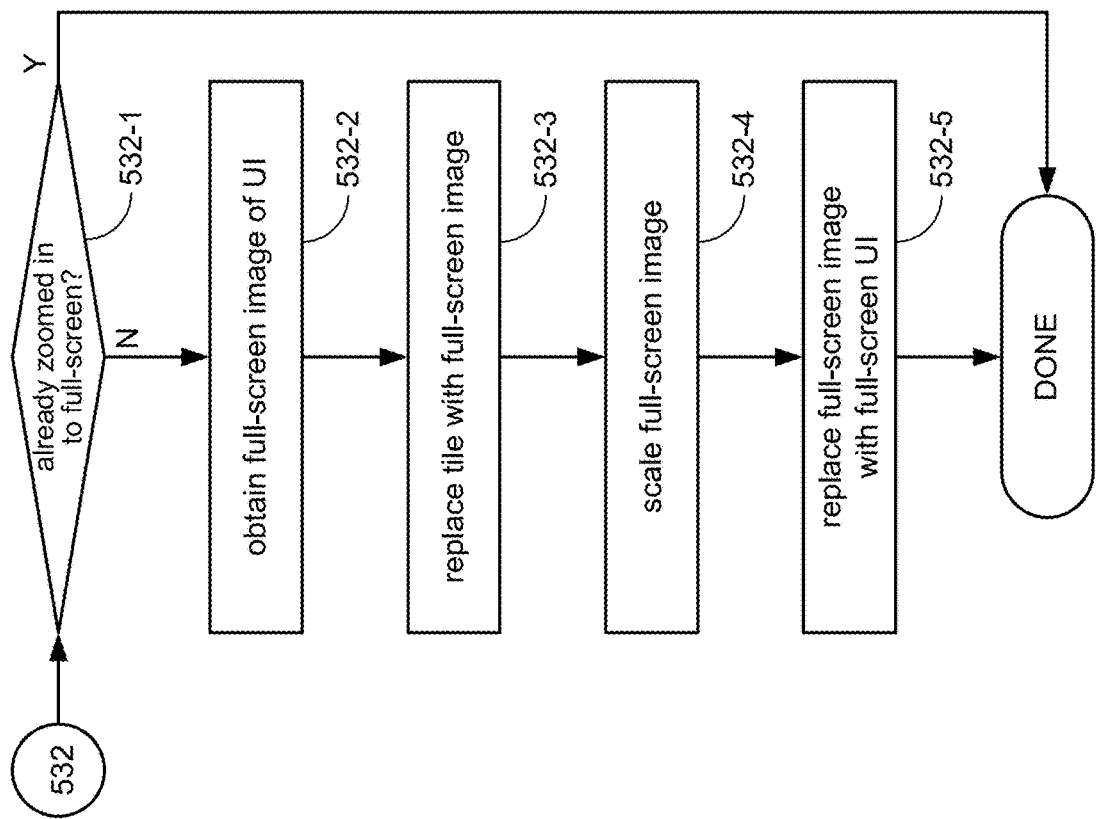

Referring now to FIG. 5A, a high level logical description of the processing for full screen animation of a tile (block 532) in accordance with some embodiments of the present disclosure will now be discussed. It will be appreciated that the specific algorithms and process flows will vary depending on a particular implementation of the animation.

As explained above, when the user makes a zoom in gesture on a tile, the UI presented in that tile will expand from tile view to a full-screen view, where the full-screen UI may occupy substantially all of the display area 106 of the display device 104. In accordance with the present disclosure, the tile view to full-screen animation includes visual cues that enable the user to remain cognizant of which tile is expanding and thus maintain their awareness of the application that is being zoomed into. As will be explained below, the animation employs several such cues.

At block 532-1, if the UI is already zoomed in to full-screen, then the process may terminate. Otherwise, processing proceeds to block 532-2, where a full-screen image of the UI in full-screen view is obtained. The full-screen image may be a default image of the UI, for example a home screen. In some embodiments, the full-screen image may be stored locally in the computing device 102, or in other embodiments may be provided to the computer by the backend servers 12.

At block 532-3, the tile that is zoomed into may be replaced by the full-screen image of the UI, sized to match the size of the tile being replaced. Replacement with the full-screen image may serve as an initial visual cue that the user has activated the zoom in action on the tile.

At block 532-4, the full-scale image that now replaces the tile may begin to scale up to fill the display area 106. In some embodiments, there may be a delay from the time of the replacement image replacement to the beginning of the scaling-up animation. In some embodiments, prior to commencing with the animation, the replacement image may be flashed (e.g., change colors) for a moment to draw the user's attention to the location of the tile in the display area 106. The scaling up animation may then proceed.

Figure 6:
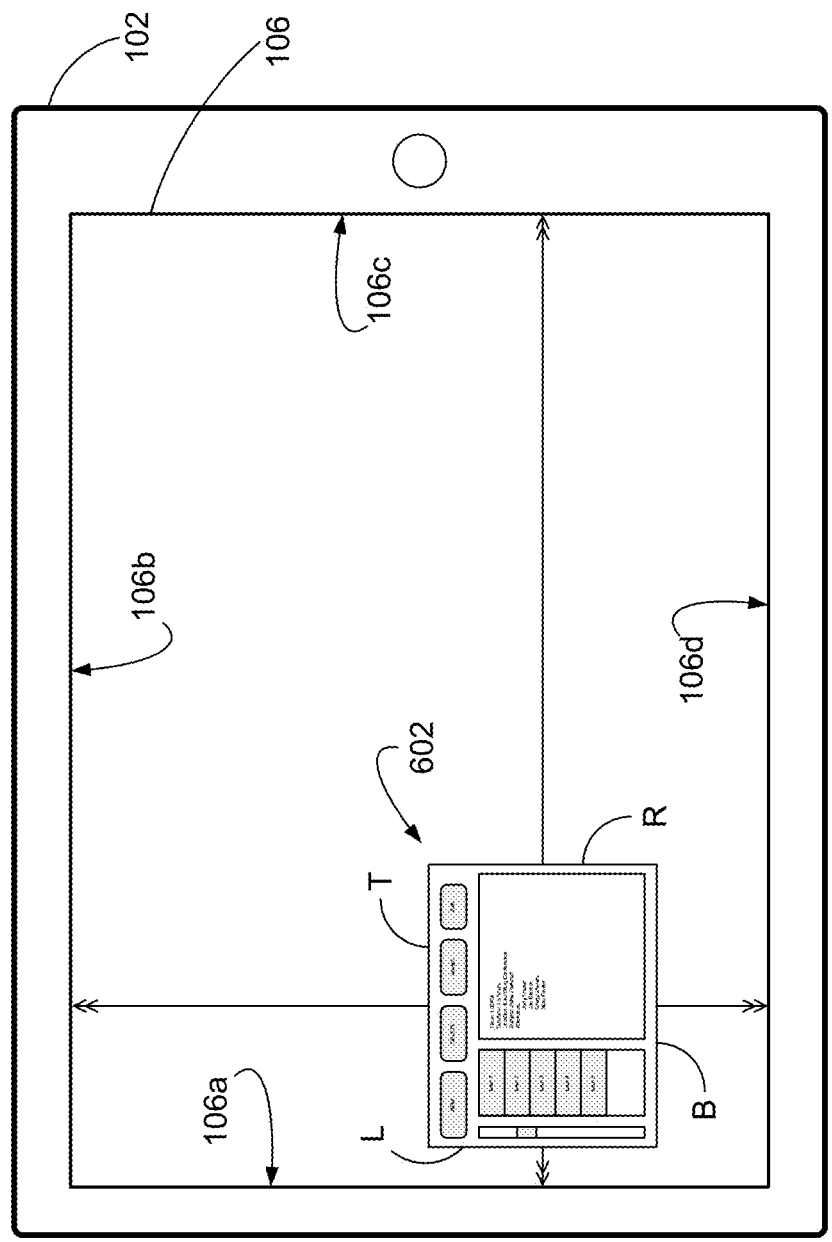
FIG. 6 shows an example illustrating aspects of a zoom in animation.

Referring for a moment to FIG. 6, an example of a scaling up animation in accordance with some embodiments of the present disclosure will now be discussed. It will be appreciated that other animations in other embodiments of the present disclosure. FIG. 6 shows an example of a full-screen image 602 that replaces a tile (e.g., 124*a*) to be zoom into. Generally, in some embodiments, the animation may begin from wherever in the display area 106 the image 602 happens to be (i.e., initial location of the tile). The initial size of the image 602 may be set to the size of the tile to be zoomed into. The animation may proceed to scale up the image 602 from its initial size to substantially fill the display area in a linear or uniform manner.

For example, the image 602 may scale up such that each side of the image (e.g., left, right, top, and bottom) moves toward respective sides 106*a*, 106*b*, 106*c*, and 106*d* of the display area 106. The speed of motion of the sides L, T, R, and B may be such that they reach their respective sides 106*a*-106*d* of the display area 106 at substantially the same time. This animation ensures a visually linear or uniform expansion to full-screen irrespective of the original size of the tile and starting aspect ratio of the tile (i.e., the starting aspect ratio of the tile can be different from the aspect ratio of the full-screen UI). This may be advantageous in that the tile sizes and tile aspect ratios can be selected for arrangement in the display area 106 without the design constraint of how a given tile will scale to full-screen view.

In some embodiments, the speed of the animation may be sufficiently slow as to further enhance the visual effect. For example, in some embodiments, the animation may last on the order of seconds, allowing the user to visually track the expansion. In other embodiments, the animation may last for a longer period of time or a shorter period of time. In still other embodiments, the speed may be selectable by the user. In some embodiments, additional animation elements (e.g., expanding wire frame) may be provided in the animation to further enhance the visual experience.

Returning to FIG. 5A, at block 532-5, upon completion of the animation, the full-screen image may be replaced with a live view of the full-screen UI. At this point, the zoom in of the UI from tile view to full-screen view may be deemed to have completed. The user may interact with the full functionality and data detail that the full-screen UI provides.

Referring now to FIG. 5B, a high level logical description of the processing for tile view animation in block 542 in accordance with some embodiments of the present disclosure will now be discussed. It will be appreciated that the specific algorithms and process flows will vary depending on a particular implementation of the animation.

As explained above, when the user makes a zoom out gesture on a full-screen UI, the UI will reduce in size from full-screen view to tile view. In accordance with the present disclosure, the full-screen view to tile view animation includes restoring the UI to tile view at the location in the display area 106 where the tile was located when the zoom in action was made, and to the original size of the tile.

At block 542-1, if the UI is already zoomed out to tile view, then the process may terminate. Otherwise, processing proceeds to block 542-2, where a screen shot image of the UI in full-screen view is obtained. For example, a screen shot of the current state of the full-screen UI.

At block 542-3, an animation of the scaling down of the full-screen UI may begin with the live full-screen UI that is presented in the display area 106 being replaced by the screen shot image of the UI obtained in block 542-2.

At block 542-4, the screen shot image of the UI that now replaces the live UI may begin to scale down, marking the beginning of the animation. In some embodiments, the screen shot image will scale down to the size of the tile that was zoomed into. The animation may complete with the scaled-down screen shot image being located in the display area 106 where the tile was originally located at the time that the zoom in action on the tile was made. In addition, any surrounding tiles that were also displayed in the display area 106 at the time of the zoom in action may be re-displayed in the display area. This restores the display area 106 to the pre-zoom in visual state, returning the user to a state of the display that they expect to see. In some embodiments, the scaling down animation may generally proceed in the reverse direction as the scaling up animation described above.

At block 542-5, upon completion of the animation, the screen shot image may be replaced with the tile view UI. At this point, the zoom out of the full-screen UI to tile view may be deemed to have completed.

Turning now to FIGS. 7 and 7A-7D, an example of the tile view to full-screen animation discussed above will be illustrated. FIG. 7 shows an initial display of tiles in display area 106, where each tile presents therein a tile view UI of the application associated with that tile. Suppose that the user made a zoom in gesture on tile 122*a*. As the figure illustrates, the animation will cause the tile 122*a* to expand along the trajectory indicated by the dashed outlines 702*a*, 702*b*, 702*c*.

The sequence shown in FIGS. 7A-7D illustrates the animation. FIG. 7A shows the tile view UI 124*a* in FIG. 7 having been replaced by an image of a full-screen UI 602. The image 602 is sized to the same size as the tile view UI 124*a*, and placed in the display area 106 at the same location as the tile view UI. As explained above, the image 602 may be flashed for a moment or otherwise visually enhanced to alert the user as to the location of the tile being zoomed into. FIGS. 7B and 7C illustrate sequences in the expansion animation of image 602. FIG. 7D shows completion of the expansion animation, where the image 602 is replace with a live UI 124b in full-screen, occupying substantially all of the display area 106.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

We claim the following:

1. A method comprising:
displaying a plurality of tiles in a display area of an output device of a computer, the plurality of tiles corresponding to a plurality of applications executing on the computer different from each other, a first tile at a first size presenting therein a single UI of a first application executing on the computer comprising a display of first information generated by the first application without activating the first application;
receiving first user input directed to the first tile;
in response to the first user input, displaying in the display area an animation of the first tile expanding from the first size to a second size; and
presenting in the first tile at the second size the UI of the first application comprising a display of second information generated by the first application different from the first information generated by the first application.

2. The method of claim 1 further comprising providing access to functionality in the UI presented in the first tile when the first tile is at the second size that is not provided in the UI when the first tile is at the first size.

3. The method of claim 1 further comprising presenting graphical UI elements in the UI presented in the first tile when the first tile is at the second size that are not presented in the UI when the first tile is at the first size.

4. The method of claim 1 wherein displaying the animation of the first tile expanding in size comprises replacing an image of the first tile of the first size with an image of the first tile of the second size that is scaled down to the first size, and presenting an animation of the scaled down image expanding in size.

5. The method of claim 1 wherein the animation of the first tile expanding in size begins at a location of the first tile so as to provide a visual cue to the user as to which tile among the plurality of tiles is expanding.

6. The method of claim 5 wherein sides of the first tile move toward respective sides of the display area and reach the respective sides of the display area at the same time.

7. The method of claim 5 wherein the animation of the first tile expanding in size includes an animation of the sides of the first tile moving toward respective sides of the display area.

8. The method of claim 5 wherein an aspect ratio of the UI presented in the first tile when the first tile is at the first size is different from an aspect ratio of the UI when the first tile is at the second size.

9. The method of claim 1 further comprising:
receiving actionable user input directed to the UI presented in the first tile; and
updating the UI presented in the first tile with new information produced by the first application responsive to the actionable user input.

10. The method of claim 1 further comprising:
receiving second user input directed to the first tile;
in response to the second user input, displaying in the display area an animation of the first tile shrinking from the second size to the first size, including replacing an image of the first tile of the second size with an image of the first tile of the first size that is scaled up to the second size, and presenting an animation of the scaled up image shrinking in size.

11. The method of claim 1 wherein the first user input is a pinch gesture.

12. The method of claim 1 wherein the output device includes a touch sensitive input component.

13. The method of claim 1, wherein the tile at the second size is full-screen.

14. A computing device comprising:
a processor;
an output device; and
a data storage device having stored thereon program code, which, when executed by the processor, causes the processor to:
display a plurality of tiles in a display area of the output device, the plurality of tiles corresponding to a plurality of applications executing on the computer different from each other, a first tile at a first size presenting therein a single UI of a first application executing on the computer comprising a display of first information generated by the first application;
receive first user input directed to the first tile;
in response to the first user input, display in the display area an animation of the first tile expanding from the first size to a second size; and
present in the first tile at the second size the UI of the first application comprising a display of second information generated by the first application different from the first information generated by the first application.

15. The computing device of claim 14 wherein the program code, which, when executed by the processor, further causes the processor to present graphical UI elements in the UI presented in the first tile when the first tile is at the second size that are not presented in the UI when the first tile is at the first size.

16. The computing device of claim 14 wherein the program code, which, when executed by the processor, further causes the processor to:
receive actionable user input directed to the UI presented in the first tile; and
update UI presented in the first tile with new information produced by the first application responsive to the actionable user input.

17. The computing device of claim 14 wherein the output device includes a touch sensitive input component.

18. A non transitory computer-readable storage medium having stored thereon program code, which, when executed by the processor, causes the processor to perform steps of:
displaying a plurality of tiles in a display area of an output device of a computer, the plurality of tiles corresponding to a plurality of applications executing on the computer different from each other, a first tile at a first size presenting therein a single UI of a first application executing on the computer comprising a display of first information generated by the first application;
receiving first user input directed to the first tile;

in response to the first user input, displaying in the display area an animation of the first tile expanding from the first size to a second size; and presenting in the first tile at the second size the UI of the first application comprising a display of second information generated by the first application different from the first information generated by the first application.

19. The non-transitory computer-readable storage medium of claim 18, further comprising program code, which, when executed by the processor, causes the processor to perform a step of presenting graphical UI elements in the UI presented in the first tile when the first tile is at the second size that are not presented in the UI when the first tile is at the first size.

* * * * *